(12) United States Patent
Shinmi (10) Patent No.: US 10,256,581 B2
(45) Date of Patent: Apr. 9, 2019

(54) CONNECTOR HOUSING MOUNTING STRUCTURE WITH MISINSTALLATION PREVENTION FEATURE

(71) Applicant: YAZAKI CORPORATION, Tokyo (JP)

(72) Inventor: Yoshifumi Shinmi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/981,682

(22) Filed: May 16, 2018

(65) Prior Publication Data

US 2018/0351309 A1    Dec. 6, 2018

(30) Foreign Application Priority Data

May 31, 2017  (JP) .................................. 2017-108107

(51) Int. Cl.
  *H01R 13/73* (2006.01)
  *F16B 17/00* (2006.01)
  *F16M 13/02* (2006.01)

(52) U.S. Cl.
  CPC ............ *H01R 13/73* (2013.01); *F16B 17/00* (2013.01); *F16M 13/02* (2013.01)

(58) Field of Classification Search
  CPC ....................................................... H01R 13/73
  USPC .................................................. 439/569, 573
  See application file for complete search history.

(56) References Cited

U.S. PATENT DOCUMENTS

| | | | | |
|---|---|---|---|---|
| 3,205,408 A | * | 9/1965 | Boehm .................. | H05K 1/182 361/761 |
| 3,346,286 A | * | 10/1967 | Wescott .................. | H01R 4/301 403/408.1 |
| 3,736,548 A | * | 5/1973 | Double ................ | H01R 13/523 174/74 R |
| 3,969,011 A | * | 7/1976 | Yamada .................. | H01R 13/64 439/569 |
| 4,577,402 A | * | 3/1986 | Swanstrom ......... | H01L 23/4006 174/16.3 |
| 5,007,862 A | * | 4/1991 | Defibaugh ............. | H01R 13/64 439/564 |
| 5,350,320 A | | 9/1994 | Hashizawa et al. | |

(Continued)

FOREIGN PATENT DOCUMENTS

JP    6-76880 A    3/1994
JP    2016-18662 A    2/2016

*Primary Examiner* — Neil Abrams
(74) *Attorney, Agent, or Firm* — Kenealy Vaidya LLP (57) ABSTRACT

A connector housing mounting structure includes a connector housing; and a mounting member having a mounting surface. The connector housing includes a housing body, and a pair of flange portions extending from the housing body and having first mounting holes respectively. The mounting member includes a pair of first columnar portions protruding in parallel with each other from the mounting surface. Each of the first columnar portions is inserted into each of the first mounting holes, and the pair of flange portions is fixed to the mounting surface, thus the connector housing is regularly mounted on the mounting surface. A size of one of the flange portions in a width direction perpendicular to an extending direction of the flange portion is larger than the other flange portion in order that in case of incorrect mounting, the larger flange becomes obstructed and forms a visible indicator of misinstallation.

3 Claims, 6 Drawing Sheets

(56) References Cited

U.S. PATENT DOCUMENTS

| | | | | |
|---|---|---|---|---|
| 5,951,306 A | * | 9/1999 | Millhimes | H01R 9/2408 439/569 |
| 6,247,939 B1 | * | 6/2001 | Bestul | H01R 13/2421 439/66 |
| 6,582,240 B2 | * | 6/2003 | Suto | H01R 13/65802 439/79 |
| 6,773,286 B1 | * | 8/2004 | Wu | H01R 13/629 439/247 |
| 7,037,133 B2 | * | 5/2006 | Matsuo | H01R 13/56 439/527 |
| 7,341,460 B1 | * | 3/2008 | McHugh | H01R 12/7047 439/569 |
| 7,762,852 B2 | * | 7/2010 | Daly | H01R 9/2491 439/562 |
| 8,545,265 B2 | * | 10/2013 | Sakamoto | B29C 45/14 439/606 |
| 8,662,920 B2 | * | 3/2014 | Ishibashi | H01R 13/6592 439/564 |
| 9,385,474 B2 | | 7/2016 | Kamei | |

\* cited by examiner

RELATED ART

RELATED ART

CONNECTOR HOUSING MOUNTING STRUCTURE WITH MISINSTALLATION PREVENTION FEATURE

CROSS-REFERENCES TO RELATED APPLICATION(S)

This application is based on and claims priority from Japanese Patent Application No. 2017-108107 filed on May 31, 2017, and the entire contents of which are incorporated herein by reference.

BACKGROUND

The present invention relates to a connector housing mounting structure.

There has been known a connector housing mounting structure in which a connector housing receiving terminals connected to end portions of electric wires is mounted on a mounting surface of a mounting member such as a bracket. One of such background-art connector housing mounting structures is, for example, a structure in which a connector housing 100 is mounted on a mounting surface 201 of a bracket 200 as shown in FIGS. 5A and 5B.

Figure 5A:
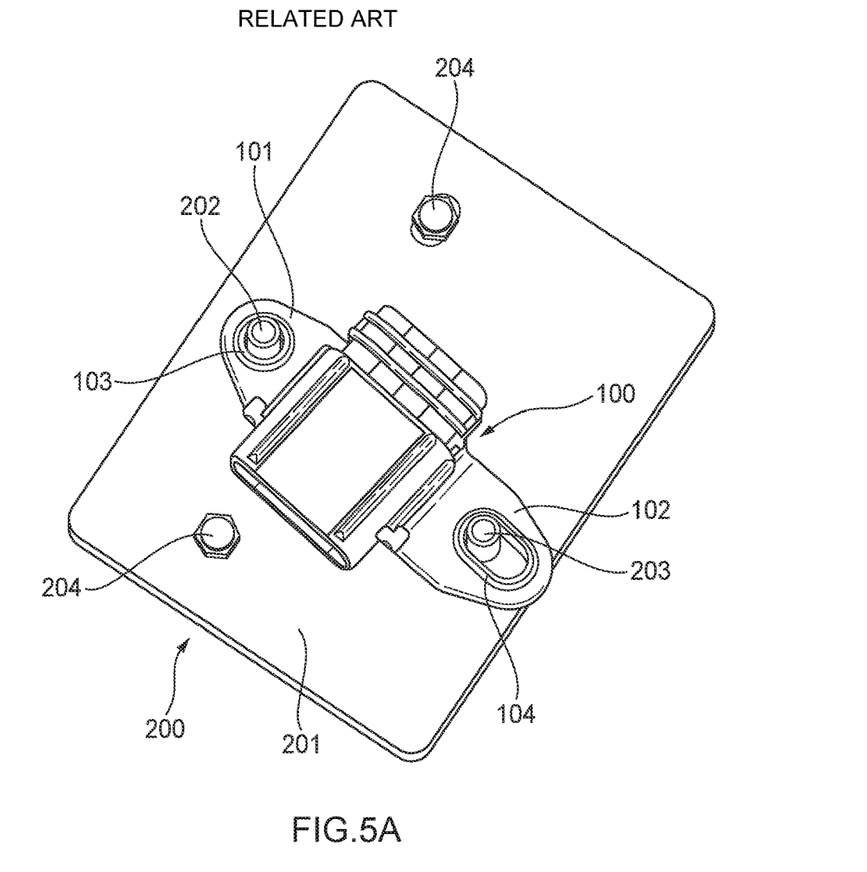
FIG. 5A and FIG. 5B show a regular installation state of a connector housing mounting structure according to the background art, FIG. 5A being a perspective view thereof, FIG. 5B being a side view thereof.
Figure 5B:
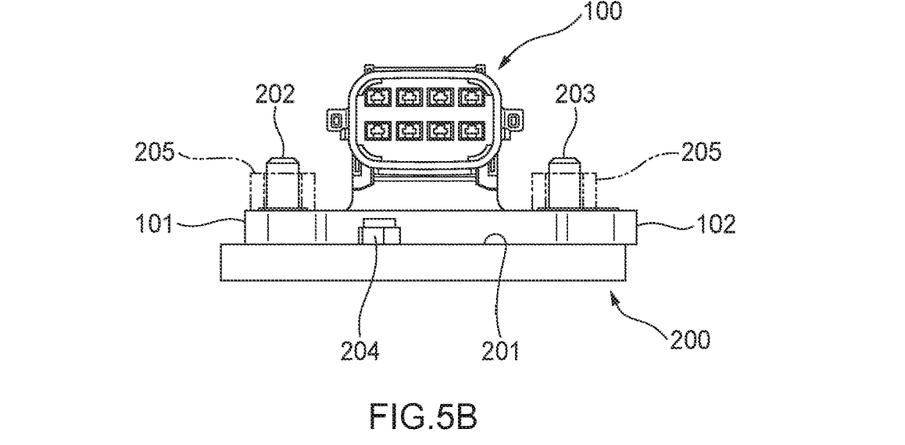

In the structure shown in FIGS. 5A and 5B, a pair of stud bolts 202 and 203 provided in the mounting surface 201 of the bracket 200 are inserted into a pair of mounting holes 103 and 104 provided in a pair of flange portions 101 and 102 integrally formed in the connector housing 100, and fixedly fastened thereto by a pair of nuts 205 and 205 (see FIG. 5B) so that the pair of flange portions 101 and 102 are in surface contact with the mounting surface 201. Thus, the connector housing 100 can be mounted regularly on the mounting surface 201 of the bracket 200 (regular installation state). Incidentally, the bracket 200 is fixed to a mounted member (not shown) such as a vehicle body panel of a vehicle through a pair of mounting portions 204.

As for details of the above mounting structure, refer to JP 6-76880 A and JP 2016-18662 A.

SUMMARY

Figure 6A:
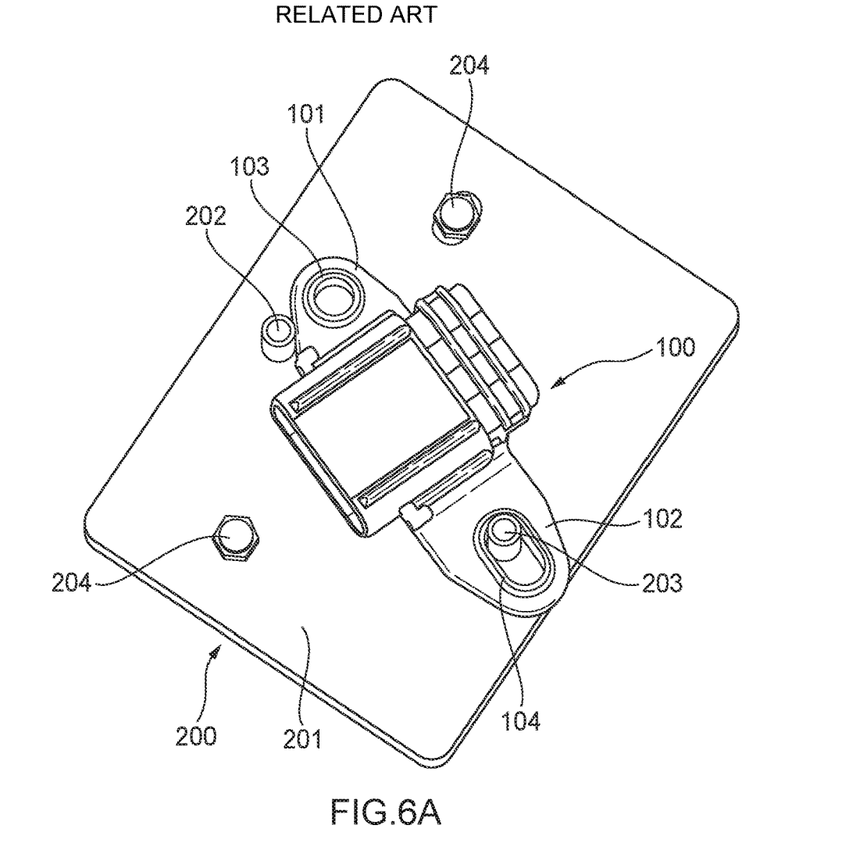
FIG. 6A and FIG. 6B show a misinstallation state of the connector housing mounting structure according to the background art, FIG. 6A being a perspective view thereof, FIG. 6B being a side view thereof.
Figure 6B:
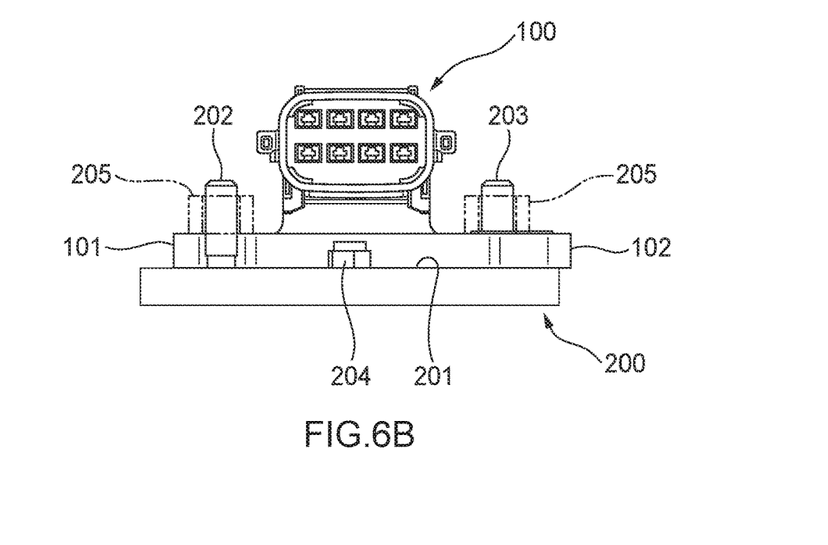

In the structure shown in FIGS. 5A and 5B, for example, the stud bolt 203 may be inserted into the mounting hole 104 of the flange portion 102 while the stud bolt 202 is located outside a widthwise end face of the flange portion 101 so as to be in contact with the end face (that is, the connector housing 100 may be slightly rotated from the regular installation state relatively to the bracket 200 when the connector housing 100 is viewed from above), as shown in FIGS. 6A and 6B. Even in this state, there is a case that the pair of nuts 205 and 205 can be fastened to a fastening completion state (see FIG. 6B) while the pair of flange portions 101 and 102 are in surface contact with the mounting surface 201. The state where the connector housing has been installed in such a wrong manner will be referred to as "misinstallation state".

In the misinstallation state shown in FIGS. 6A and 6B, particularly when the rotation angle of the connector housing 100 from the regular installation state is small, a worker who performs working for mounting the connector housing cannot easily distinguish the misinstallation state from the regular installation state even when the worker observes the connector housing from above. Thus, the worker cannot easily detect misinstallation visually. In addition, the pair of flange portions 101 and 102 are in surface contact with the mounting surface 201. That is, in side view, the connector housing 100 is not inclined from the regular installation state with respect to the bracket 200. Accordingly, even when the worker observes the connector housing from side, the worker cannot easily distinguish the misinstallation state from the regular installation state. Thus, the worker cannot easily detect misinstallation visually. Further, the pair of nuts 205 and 205 can be fastened to the fastening completion state. Accordingly, there is no error occurring during the fastening work. Thus, the worker cannot easily detect misinstallation based on an error occurring during the fastening work.

The present invention has been developed in consideration of the aforementioned situation. An object of the invention is to provide a connector housing mounting structure in which misinstallation of a connector housing on a mounting member can be detected easily.

Embodiments of the present invention provide the following items (1) to (4).

(1)

A connector housing mounting structure comprising:
a connector housing receiving terminals connected to an end portion of an electric wire; and
a mounting member having a mounting surface for mounting the connector housing thereon,
the connector housing being mounted on the mounting surface of the mounting member,
the connector housing including a housing body, and a pair of flange portions extending from the housing body in opposite directions to each other and having first mounting holes respectively,
the mounting member including a pair of first columnar portions corresponding to the pair of first mounting holes and protruding in parallel with each other from the mounting surface,
the pair of first columnar portions being inserted into the pair of first mounting holes, and the pair of flange portions being fixed to the mounting surface with first fastening members, thus the connector housing being regularly mounted on the mounting surface,
a size of one of the flange portions in a width direction perpendicular to an extending direction of the flange portion being larger than a size of the other flange portion in the width direction.

(2)

The connector housing mounting structure according to item 1, wherein,
the mounting member further including a pair of mounting portions to mount the mounting member on a mounted member, the pair of mounting portions being located away from the pair of flange portions on one side and the other side of the flange portions in the width direction respectively to eliminate an interference with the connector housing, when the connector housing is regularly mounted on the mounting surface, and
one of the pair of mounting portions being located to interfere with the one of the flange portions, when the first columnar portion corresponding to the other of the flange portions is inserted into the first mounting hole of the other of the flange portions and the first columnar portion corresponding to the one of the flange portions is located outside of the one of the flange portions in the width direction to be in contact with its outer surface.

(3)

The connector housing mounting structure according to item (2), wherein,
the pair of mounting portions each being located at a position where a distance between a line segment connecting the pair of first columnar portions and each of the mounting portions is smaller than the size of the one flange portion in the width direction, when observed from a extending direction of the pair of first columnar portions.

(4)

The connector housing mounting structure according to item (2) or item (3), wherein, the pair of mounting portions are a pair of second mounting holes, and a pair of second columnar portions provided in the mounted member are inserted into the pair of second mounting holes, and the mounting member is fixed to the mounted member with second fastening members, thus the mounting member is mounted on the mounted member.

According to first aspect of the invention, relating to the item (1), the width of one of the flange portions is large. Accordingly, the rotation angle (see θ1 in FIG. 3A and FIG. 4A) of the connector housing in the misinstallation state from the regular installation state becomes comparatively large. As a result, a worker can easily distinguish the misinstallation state from the regular installation state when the worker observes the misinstallation state from above. Thus, the worker can easily detect misinstallation visually from above.

According to second aspect of the invention, relating to the item (2), in the misinstallation state, the end portion of one of the flange portions in the width direction interferes with the mounting portion protruding from the mounting surface, and runs over the mounting portion. Accordingly, the connector housing is inclined from the regular installation state relatively to the mounting surface of the bracket in side view (the pair of flange portions are not in surface contact with the mounting surface). As a result, the worker can easily distinguish the misinstallation state from the regular installation state when the worker observes the misinstallation state from side. Thus, the worker can easily detect misinstallation visually from side.

In addition, particularly when an inclination angle (see θ2 in FIG. 3B and FIG. 4B) of the connector housing from the regular installation state is larger than a predetermined angle, the first fastening member on one flange side cannot be fastened to the fastening completion state. Accordingly, due to an error occurring during the fastening work, the worker can easily detect misinstallation also based on the error occurring during the fastening work.

According to third aspect of the invention, relating to the item (3), the connector housing mounting structure having the aforementioned item (2) can be obtained only if a simple dimensional relation is retained.

According to fourth aspect of the invention, relating to the item (4), a structure protruding from the mounting surface so that an end portion of one of the flange portions in the width direction can run over the protruding structure in the misinstallation state can be obtained by a simple configuration.

According to the invention, it is possible to provide a connector housing mounting structure in which misinstallation of a connector housing on a mounting member can be detected easily.

Several aspects of the invention have been described briefly above. The further details of the invention will be made clearer if the following description is read through with reference to the accompanying drawings.

DETAILED DESCRIPTION

Embodiment

A connector housing mounting structure according to an embodiment of the present invention (hereinafter also referred to as "this mounting structure") will be described below with reference to the drawings. This mounting structure is, for example, mounted and used on a vehicle.

Figure 1A:
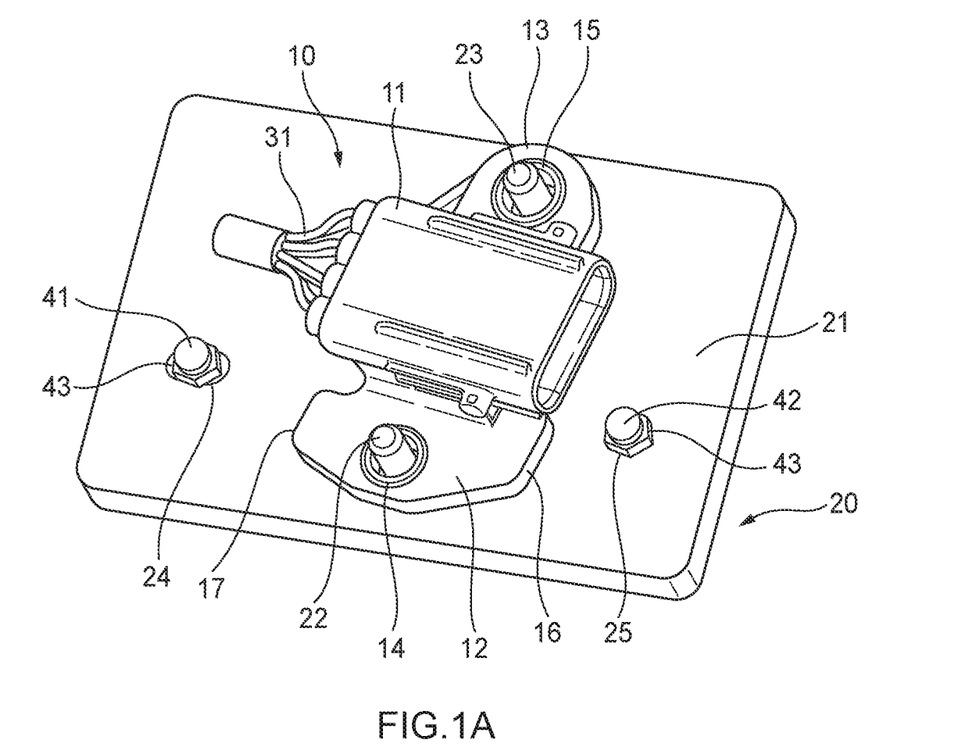
FIG. 1A and FIG. 1B show a regular installation state of a connector housing mounting structure according to an embodiment of the present invention, FIG. 1A being a perspective view thereof, FIG. 1B being a side view thereof.
Figure 1B:
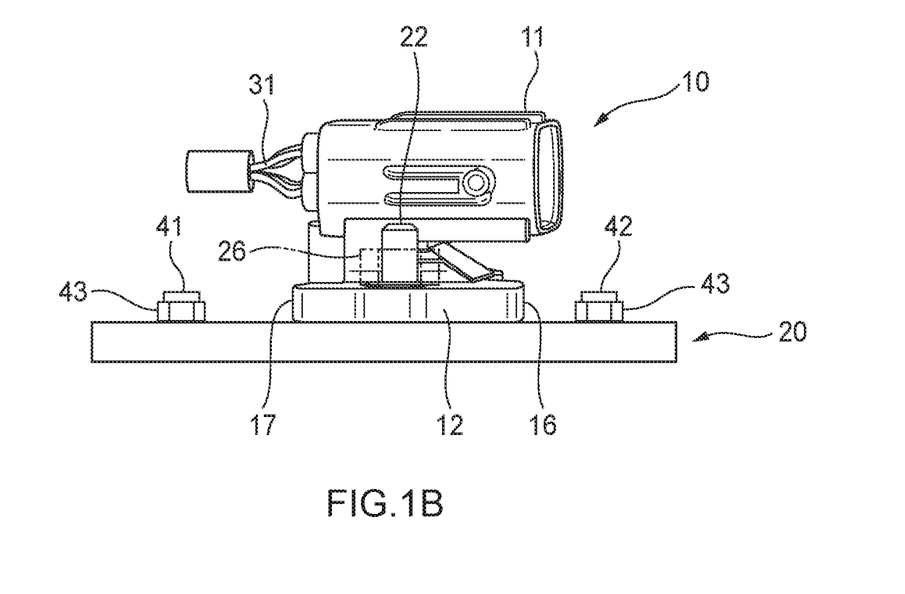

As shown in FIG. 1A and FIG. 1B, this mounting structure is a structure for mounting a connector housing 10 on a mounting surface 21 of a bracket 20. The bracket 20 is mounted on a mounted member (not shown) such as a vehicle body panel of a vehicle.

The connector housing 10 is a resin molded article, which has a housing body 11, and a pair of flange portions 12 and 13 formed integrally with the housing body 11. The housing body 11 has a substantially angularly cylindrical shape with a longitudinal direction. Inside the housing body 11, a plurality of terminal reception holes (not shown) are integrally formed along the longitudinal direction. A plurality of terminals (not shown) connected to end portions of a plurality of electric wires 31 are inserted and fixed into the terminal reception holes of the housing body 11. Accordingly, the electric wires 31 extend from one longitudinal end of the housing body 11. A mating connector housing (not shown) can be fitted to the other longitudinal end of the housing body 11.

The pair of flange portions 12 and 13 are a pair of wing-shaped parts extending in opposite directions to each other from a low portion of the housing body 11. The flange portions 12 and 13 are used for mounting the connector housing 10 on the bracket 20. A pair of first mounting holes (through holes) 14 and 15 are formed in the flange portions 12 and 13 respectively.

The bracket 20 is a plate-like member made of metal. An upper surface (flat surface) of the bracket 20 forms the mounting surface 21 for mounting the connector housing 10 thereon. A pair of stud bolts 22 and 23 are provided integrally with the bracket 20 and correspondingly to the pair of first mounting holes 14 and 15 so as to protrude upward from the mounting surface 21 and in parallel with each other.

The pair of stud bolts 22 and 23 are inserted into the pair of first mounting holes 14 and 15 from below, and the pair of flange portions 12 and 13 are fixed to the mounting surface 21 by nuts 26 (see FIG. 1B) so as to be in surface contact with the mounting surface 21. Thus, the connector housing 10 is regularly mounted on the mounting surface 21 of the bracket 20. This mounting state will be referred to as "regular installation state".

A pair of second mounting holes (through holes) 24 and 25 for mounting the bracket 20 on the mounted member are formed in the bracket 20. The pair of second mounting holes 24 and 25 are formed in positions away from the pair of flange portions 12 and 13 and on one side and the other side of the flange portions 12 and 13 in the width direction so as not to interfere with the connector housing 10 when the connector housing 10 is in the regular installation state with respect to the bracket 20.

A pair of bolts 41 and 42 provided in the mounted member are inserted into the pair of second mounting holes 24 and 25 from below, and the bracket 20 is fixedly fastened to the mounted member by nuts 43 and 43. Thus, the bracket 20 is mounted on the mounted member.

Figure 2:
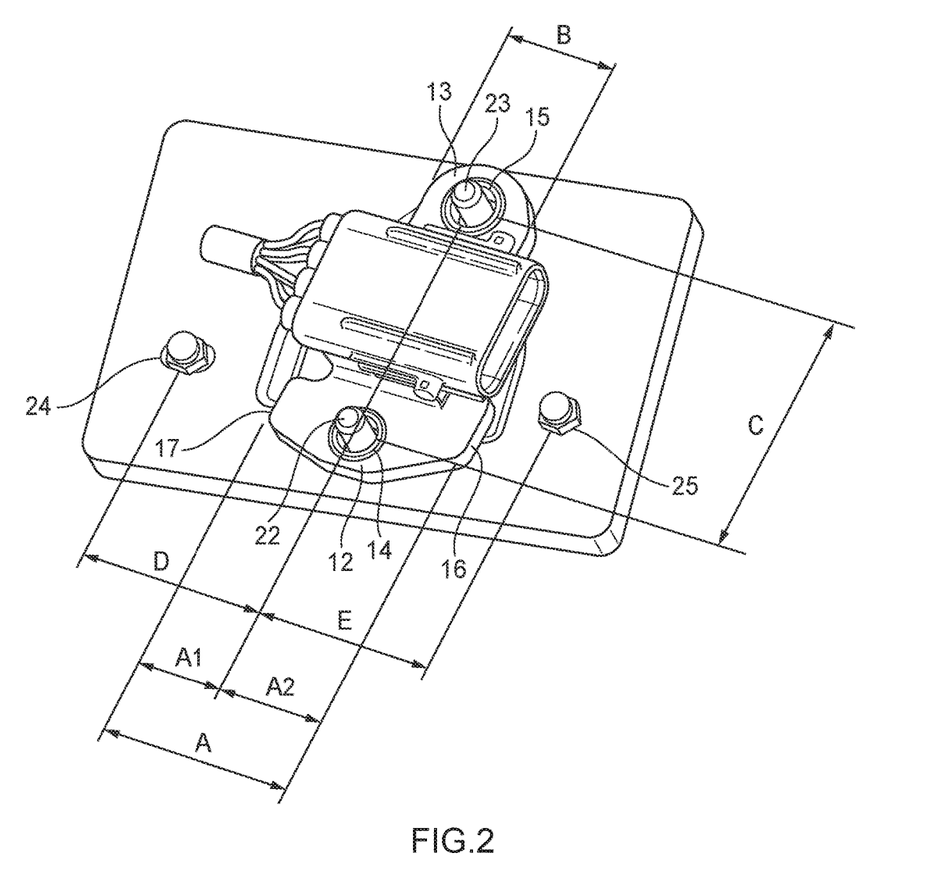
FIG. 2 is a view for explaining various dimensions in the connector housing mounting structure according to the embodiment of the invention.

For convenience of explanation, as shown in FIG. 2, various dimensions will be defined below. Specifically, A designates a distance (width) between opposite end faces 16 and 17 of the flange portion 12 in the width direction perpendicular to the direction in which the flange portion 12 extends, and B designates a distance (width) between opposite end faces of the flange portion 13 in the width direction perpendicular to the direction in which the flange portion 13 extends. C designates a distance between the pair of first mounting holes 14 and 15 (the pair of stud bolts 22 and 23). A1 designates a distance between the first mounting hole 14 and the end face 17, and A2 designates a distance between the first mounting hole 14 and the end face 16.

When this mounting structure is observed from above (observed from the direction in which the pair of stud bolts 22 and 23 extend), D designates a distance between a line segment connecting the pair of stud bolts 22 and 23 and the second mounting hole 24, and E designates a distance between the line segment and the second mounting hole 25.

In this mounting structure, it is preferable that the width A of the flange portion 12 is larger than the width B of the flange portion 13. Particularly it is preferable that the width A is 1.5 or more times as large as the width B. In addition, the width A is larger than the distance D, and larger than the distance E. Description will be made about the operation and effect of this mounting structure obtained by such dimensional relations.

In this mounting structure, the bracket 20 is first mounted on the mounted member, and the connector housing 10 is then mounted on the bracket 20. The following description will be made on the assumption that a worker who is to mount the connector housing 10 on the bracket 20 performs working for inserting the stud bolt 22 into the first mounting hole 14 after completely inserting the stud bolt 23 into the first mounting hole 15.

When the worker can insert the stud bolt 22 into the first mounting hole 14 after completely inserting the stud bolt 23 into the first mounting hole 15, the regular installation state shown in FIG. 1A and FIG. 1B can be obtained.

Figure 3A:
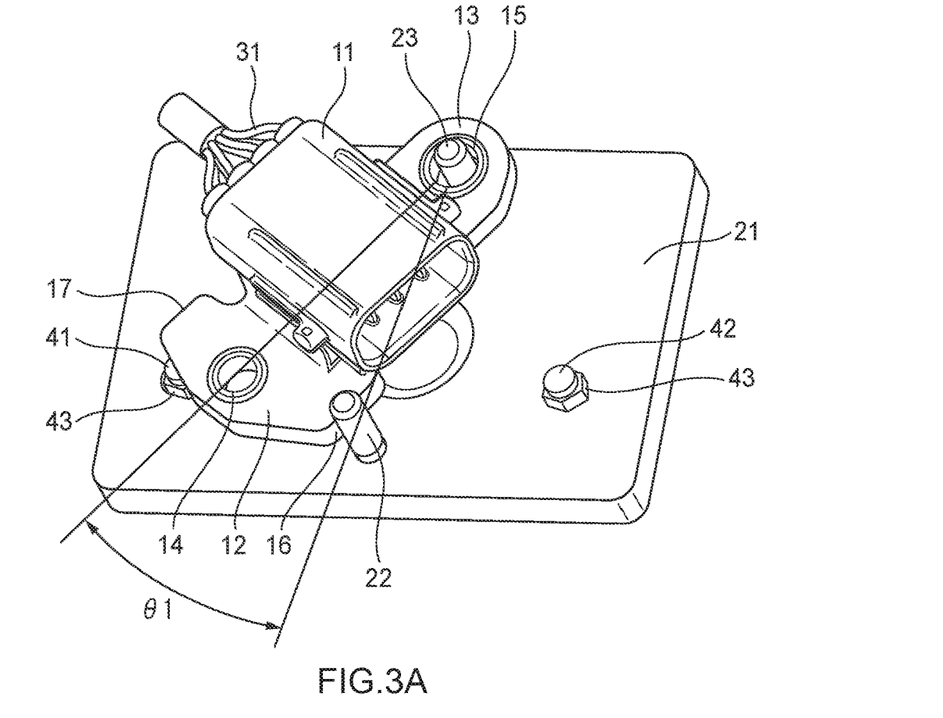
FIG. 3A and FIG. 3B show a first misinstallation state of the connector housing mounting structure according to the embodiment of the invention, FIG. 3A being a perspective view thereof, FIG. 3B being a side view thereof.
Figure 3B:
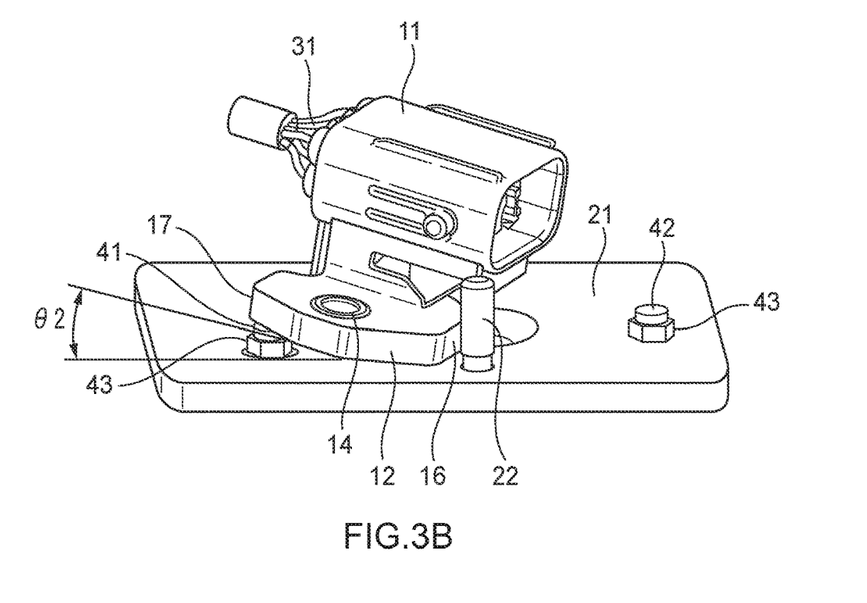

On the other hand, in the situation where the worker cannot visually observe a part to be subjected to the mounting work, the worker has to insert the stud bolt 22 into the first mounting hole 14 by touch (based on his/her experience and intuition). Therefore, as shown in FIG. 3A and FIG. 3B, there may occur a case that the worker tries to mount the connector housing 10 in a wrong manner in a state where the stud bolt 23 is inserted into the first mounting hole 15 while the stud bolt 22 is located outside the widthwise end face 16 of the flange portion 12 so as to be in contact with the end face 16 (that is, a state where the connector housing 10 is rotated clockwise by a rotation angle $\theta 1$ from the regular installation state relatively to the bracket 20 when observed from above). This case will be referred to as "first misinstallation state".

Here, the width A of the flange portion 12 is larger than the width B of the flange portion 13, as described above. Therefore, the width A of the flange portion 12 itself is large, and hence the distance A2 (see FIG. 2) is also large. Thus, in the first misinstallation state shown in FIG. 3A and FIG. 3B, the rotation angle $\theta 1$ increases due to the large distance A2. As a result, when the worker observes the first misinstallation state, the worker can easily distinguish the first misinstallation state from the regular installation state. Thus, the worker can easily detect misinstallation visually from above.

In addition, the width A of the flange portion 12 is larger than the distance D, as described above. Therefore, in the first misinstallation state shown in FIG. 3A and FIG. 3B, the widthwise end portion of the flange portion 12 on the end face 17 side interferes with the bolt 41 (or the nut 43) protruding from the mounting surface 21, and runs thereon. Thus, the connector housing 10 is inclined by an inclination angle $\theta 2$ (see FIG. 3B) from the regular installation state with respect to the mounting surface 21 of the bracket 20 (the pair of flange portions 12 and 13 are not in surface contact with the mounting surface 21) when the connector housing 10 is observed from side. As a result, when the worker observes the first misinstallation state from side, the worker can easily distinguish the first misinstallation state from the regular installation state. Thus, the worker can easily detect misinstallation visually from side.

In addition, particularly when the inclination angle $\theta 2$ (see FIG. 3B) is larger than a predetermined angle, the nut 26 (see FIG. 1B) on the flange portion 13 side cannot be fastened to a fastening completion state. Therefore, due to an error occurring during the fastening work, the worker can easily detect misinstallation also based on the error occurring during the fastening work.

As has been described above, in this mounting structure, misinstallation can be easily detected visually from above, visually from side, and based on an error occurring during the fastening work in spite of occurrence of the first misinstallation state shown in FIG. 3A and FIG. 3B.

Figure 4A:
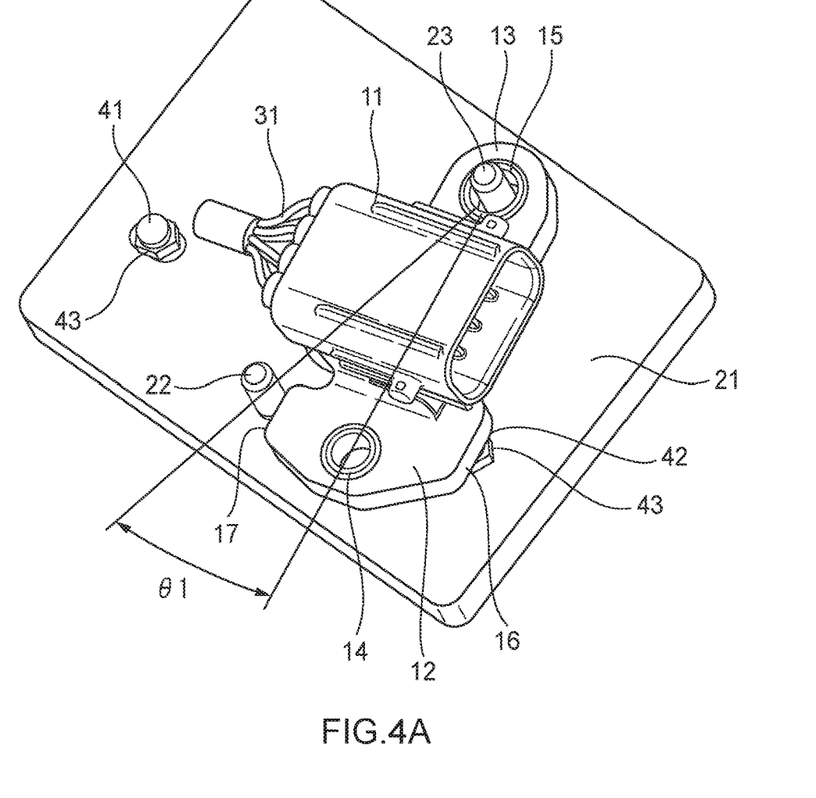
FIG. 4A and FIG. 4B show a second misinstallation state of the connector housing mounting structure according to the embodiment of the invention, FIG. 4A being a perspective view thereof, FIG. 4B being a side view thereof.
Figure 4B:
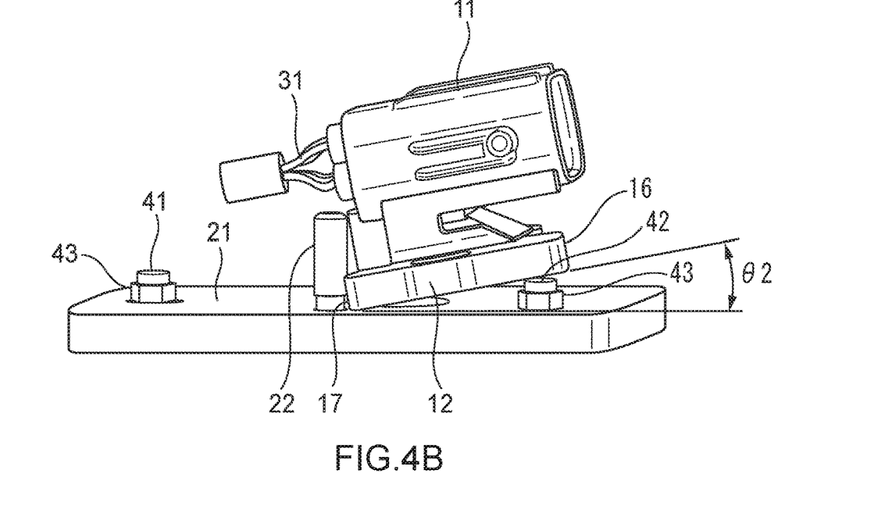

In the same manner, when the worker has to insert the stud bolt 22 into the first mounting hole 14 by touch (based on his/her experience and intuition), as shown in FIG. 4A and FIG. 4B, there may occur a case that the worker tries to mount the connector housing 10 in a wrong manner in a state where the stud bolt 23 is inserted into the first mounting hole 15 while the stud bolt 22 is located outside the widthwise end face 17 of the flange portion 12 so as to be in contact with the end face 17 (that is, a state where the connector housing 10 is rotated counterclockwise by a rotation angle $\theta 1$ from the regular installation state relatively to the bracket 20 when observed from above). This case will be referred to as "second misinstallation state".

Here, in the same manner as described above, the width A of the flange portion 12 itself is large, and hence the distance A1 (see FIG. 2) is also large. Thus, in the second misinstallation state shown in FIG. 4A and FIG. 4B, the rotation angle $\theta 1$ increases due to the large distance A1. As a result, when the worker observes the second misinstallation state, the worker can easily distinguish the second misinstallation state from the regular installation state. Thus, the worker can easily detect misinstallation visually from above.

In addition, the width A of the flange portion 12 is larger than the distance E, as described above. Therefore, in the second misinstallation state shown in FIG. 4A and FIG. 4B, the widthwise end portion of the flange portion 12 on the end face 16 side interferes with the bolt 42 (or the nut 43) protruding from the mounting surface 21, and runs thereon. Thus, the connector housing 10 is inclined by an inclination angle θ2 (see FIG. 4B) from the regular installation state with respect to the mounting surface 21 of the bracket 20 (the pair of flange portions 12 and 13 are not in surface contact with the mounting surface 21) when the connector housing 10 is observed from side. As a result, when the worker observes the second misinstallation state from side, the worker can easily distinguish the second misinstallation state from the regular installation state. Thus, the worker can easily detect misinstallation visually from side.

In addition, particularly when the inclination angle θ2 (see FIG. 4B) is larger than a predetermined angle, the nut 26 (see FIG. 1B) on the flange portion 13 side cannot be fastened to a fastening completion state. Therefore, due to an error occurring during the fastening work, the worker can easily detect misinstallation also based on the error occurring during the fastening work.

As has been described above, in this mounting structure, misinstallation can be easily detected visually from above, visually from side, and based on an error occurring during the fastening work in spite of occurrence of the second misinstallation state shown in FIG. 4A and FIG. 4B, in the same manner as in the case where the first misinstallation state occurs.

The larger the rotation angle θ1 (see FIG. 3A and FIG. 4A) is, the more easily the worker can detect misinstallation visually from above. The rotation angle θ1 depends on (distance A1/distance C) or (distance A2/distance C). In order to increase the rotation angle θ1, it will go well if (distance A1/distance C) or (distance A2/distance C) is increased.

In addition, the larger the rotation angle θ2 (see FIG. 3B and FIG. 4B) is, the more easily the worker can detect misinstallation visually from side. The rotation angle θ2 depends on (protruding height of the bolt 41 from the mounting surface 21/distance D) or (protruding height of the bolt 42 from the mounting surface 21/distance E). In order to increase the rotation angle θ2, it will go well if (protruding height of the bolt 41 from the mounting surface 21/distance D) or (protruding height of the bolt 42 from the mounting surface 21/distance E) is increased.

According to this mounting structure, as described above, of the pair of flange portions 12 and 13, the flange portion 12 has a large width. Therefore, the rotation angle θ1 (see FIG. 3A or FIG. 4A of the connector housing 10 from the regular installation state increases in the first or second misinstallation state. As a result, when the worker observes the first or second misinstallation state from above, the worker can easily distinguish the first or second misinstallation state from the regular installation state. Thus, the worker can easily detect misinstallation visually from above.

In addition, according to this mounting structure, in the first or second misinstallation state, the widthwise end portion of the flange portion 12 interferes with the bolt 41 or 42 (or the nut 43) protruding from the mounting surface 21 of the bracket 20, and runs thereon. Thus, the connector housing 10 is inclined by the inclination angle θ2 (see FIG. 3B or FIG. 4B) from the regular installation state with respect to the mounting surface 21 of the bracket 20 (the pair of flange portions 12 and 13 are not in surface contact with the mounting surface 21) when the connector housing 10 is observed from side. As a result, when the worker observes the first or second misinstallation state from side, the worker can easily distinguish the first or second misinstallation state from the regular installation state. Thus, the worker can easily detect misinstallation visually from side.

In addition, particularly when the inclination angle θ2 (see FIG. 3B or FIG. 4B) of the connector housing 10 from the regular installation state is larger than a predetermined angle, the nut 26 (see FIG. 1B) on the flange portion 13 side of the pair of flange portions 12 and 13 cannot be fastened to a fastening completion state. Therefore, due to an error occurring during the fastening work, the worker can easily detect misinstallation also based on the error occurring during the fastening work.

Other Embodiments

The present invention is not limited to any of the aforementioned embodiments, but various modifications may be made within the scope of the invention.

For example, although the width A is larger than both the distance D and the distance E (see FIG. 2) in the aforementioned embodiment, it will go well even if the width A is larger than one of the distance D and the distance E and not larger than the other of the distance D and the distance E. Further, the width A may be smaller than both the distance D and the distance E.

When the width A is smaller than both the distance D and the distance E, the inclination angle θ2 (>0) does not occur in both the first and second misinstallation states (the pair of flange portions 12 and 13 are in surface contact with the mounting surface 21). However, the rotation angle θ1 (>0) occurs. Therefore, at least when the worker observes the first or second misinstallation state from above, the worker can easily distinguish the first or second misinstallation state from the regular installation state, and can easily detect misinstallation visually from above.

In the aforementioned embodiment, the pair of bolts 41 and 42 provided in the mounted member are inserted, from below, into the pair of second mounting holes 24 and 25 formed in the bracket 20, and the bracket 20 is fixedly fastened to the mounted member by the nuts 43 and 43. Thus, the bracket 20 is mounted on the mounted member.

However, a pair of downward stud bolts provided in the bracket 20 may be inserted into a pair of mounting holes provided in the mounted member, and the bracket 20 may be fixedly fastened to the mounted member by nuts, so that the bracket 20 can be mounted on the mounted member. In this case, a pair of parts protruding upward from the mounting surface 21 of the bracket 20 have to be provided correspondingly to the positions where the pair of downward stud bolts are provided in the bracket 20, so that a widthwise end portion of the flange portion 12 can interfere with one of the protruding parts and run thereon in the first or second misinstallation state.

Here, the features of the aforementioned embodiments of the connector housing mounting structures according to the invention will be summarized and listed briefly in the following items [1] to [4].

[1] A connector housing mounting structure comprising:
a connector housing (10) receiving terminals connected to an end portion of an electric wire (31); and
a mounting member (20) having a mounting surface (21) for mounting the connector housing thereon, the connector housing being mounted on the mounting surface of the mounting member, the connector housing including a housing body (11), and a pair of flange portions (12 and 13) extending from the housing body in opposite directions to each other and having first mounting holes (14 and 15) respectively, the mounting member including a pair of first columnar portions (22 and 23) corresponding to the pair of first mounting holes and protruding in parallel with each other from the mounting surface (21), the pair of first columnar portions (22 and 23) being inserted into the pair of first mounting holes (14 and 15), and the pair of flange portions (12 and 13) being fixed to the mounting surface (21) with first fastening members (26 and 26), thus the connector housing (10) being regularly mounted on the mounting surface, a size (A) of one of the flange portions (12) in a width direction perpendicular to an extending direction of the flange portion being larger than a size (B) of the other flange portion (13) in the width direction.

[2] The connector housing mounting structure according to item [1], wherein, the mounting member (20) further including a pair of mounting portions (24 and 25) to mount the mounting member (20) on a mounted member, the pair of mounting portions being located away from the pair of flange portions (12 and 13) on one side and the other side of the flange portions in the width direction respectively to eliminate an interference with the connector housing, when the connector housing is regularly mounted on the mounting surface, and one of the pair of mounting portions being located to interfere with the one of the flange portions (12), when the first columnar portion (23) corresponding to the other of the flange portions (13) is inserted into the first mounting hole (15) of the other of the flange portions and the first columnar portion (22) corresponding to the one of the flange portions is located outside of the one of the flange portions in the width direction to be in contact with its outer surface (16 or 17).

[3] The connector housing mounting structure according to item [2], wherein, the pair of mounting portions (22 and 23) each being located at a position where a distance (D, E) between a line segment connecting the pair of first columnar portions (22 and 23) and each of the mounting portions (24 and 25) is smaller than the size (A) of the one flange portion in the width direction, when observed from a extending direction of the pair of first columnar portions.

[4] The connector housing mounting structure according to item [2] or item [3], wherein, the pair of mounting portions (24 and 25) are a pair of second mounting holes, and a pair of second columnar portions (41 and 42) provided in the mounted member are inserted into the pair of second mounting holes (24 and 25), and the mounting member (20) is fixed to the mounted member with second fastening members (43 and 43), thus the mounting member is mounted on the mounted member.

REFERENCE SIGNS LIST 10 connector housing
11 housing body
12, 13 pair of flange portions
14, 15 pair of first mounting holes
16, 17 end face
20 bracket (mounting member)
21 mounting surface
22, 23 pair of stud bolts (pair of first columnar portions)
24, 25 pair of second mounting holes (pair of mounting portions)
26 nut (first fastening member)
31 electric wire
41, 42 pair of bolts (pair of second columnar portions)
43 nut (second fastening member)

The invention claimed is:

1. A connector housing mounting structure comprising:
a connector housing receiving terminals connected to an end portion of an electric wire; and
a mounting member having a mounting surface for mounting the connector housing thereon,
the connector housing being mounted on the mounting surface of the mounting member,
the connector housing including a housing body, and a pair of flange portions extending from the housing body in opposite directions to each other and having first mounting holes respectively,
the mounting member including a pair of first columnar portions corresponding to the pair of first mounting holes and protruding in parallel with each other from the mounting surface,
the pair of first columnar portions being inserted into the pair of first mounting holes, and the pair of flange portions being fixed to the mounting surface with first fastening members, thus the connector housing being regularly mounted on the mounting surface,
a size of one of the flange portions in a width direction perpendicular to an extending direction of the flange portion being larger than a size of the other flange portion in the width direction,
wherein the mounting member further including a pair of mounting portions to mount the mounting member on a mounted member, the pair of mounting portions being located away from the pair of flange portions on one side and the other side of the flange portions in the width direction respectively to eliminate an interference with the connector housing, when the connector housing is regularly mounted on the mounting surface, and
one of the pair of mounting portions being located to interfere with the one of the flange portions, when the first columnar portion corresponding to the other of the flange portions is inserted into the first mounting hole of the other of the flange portions and the first columnar portion corresponding to the one of the flange portions is located outside of the one of the flange portions in the width direction to be in contact with its outer surface.

2. The connector housing mounting structure according to claim 1, wherein,
the pair of mounting portions each being located at a position where a distance between a line segment connecting the pair of first columnar portions and each of the mounting portions is smaller than the size of the one flange portion in the width direction, when observed from a extending direction of the pair of first columnar portions.

3. The connector housing mounting structure according to claim 1, wherein,
the pair of mounting portions are a pair of second mounting holes, and
a pair of second columnar portions provided in the mounted member are inserted into the pair of second mounting holes, and the mounting member is fixed to the mounted member with second fastening members, thus the mounting member is mounted on the mounted member.

\* \* \* \* \*